United States Patent Office 3,040,020
Patented June 19, 1962

3,040,020
METAL COMPLEX OF 4-CYANONAPHTHYL-AZOPYRAZOLONE
Rolf Pütter, Dusseldorf, and Carlhans Süling, Leverkusen, Germany, assignors to Farbenfabriken Bayer Aktiengesellschaft, Leverkusen, Germany, a corporation of Germany
No Drawing. Filed Jan. 15, 1960, Ser. No. 2,587
Claims priority, application Germany Jan. 17, 1959
1 Claim. (Cl. 260—147)

The present invention relates to new azo dyestuffs; more particularly it relates to metal-containing azo dyestuffs of the formula

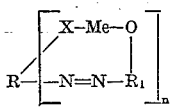

In this formula R stands for a carbocylic or heterocyclic radical containing one to three nuclei which have 5 or 6 ring members, R carrying the substituent —X— in o-position to the azo bridge, X stands for —O— or —CO— wherein —CO— is linked with R via the carbon atom; $R_1$ is the radical of a 4-cyano-naphthalene which carries the azo bridge in 1-position and the —O— group in the 2-position; Me stands for a copper, cobalt or chromium atom, and $n$ stands for the integer 1 or 2.

It is an object of the invention to provide valuable metal-complex azo dyestuffs which are particularly suitable for the dyeing of wool and fibres of natural cellulose onto which dyeing of excellent fastness properties are obtainable.

According to the invention it has been found that valuable metal-containing azo dyestuffs are obtainable by coupling diazo, diazoazo or tetrazo compounds which contain in the o-position to the diazo group a hydroxyl group or a carboxy group or a substituent which may be converted into one of these complex-forming groups under the conditions of metallisation, with a 2-hydroxy-4-cyanonaphthalene which may contain further substituents, or by combining the diazo compound of a 1-amino-2-hydroxy-4-cyanonaphthalene which may be further substituted, with azo components which couple in the o-position to a hydroxyl group or are convertible into such a group, and converting the azo dyestuffs thus formed into their copper, cobalt or chromium complex compounds in substance or on a substrate.

The coupling is carried out in accordance with the type of the starting component employed in an aqueous or organic, acid, neutral or alkaline medium.

The 2-hydroxy-4-cyanonaphthalene or its substitution products used as starting component may be produced, for example, by the process described in Journal of the Chemical Society [1944] (London) page 540. The 1-amino-2-hydroxy-4-cyano-naphthalenes may be produced, for example by the process disclosed in British patent specification No. 381,602.

For coupling with the 2-hydroxy-4-cyanonaphthalene or its substitution products there are suitable, for example diazotised o-aminophenols and o-amino-benzene carboxylic acid such as 2-amino-1-hydroxybenzene, 2-amino-4-chloro-1-hydroxybenzene, 2-amino-4-nitro-1-hydroxybenzene, 2-amino-1-hydroxybenzene-4-sulphonamide, 3-amino-4-hydroxyphenyl-ethylsulphone, 2-amino-4-chloro-5-sulphonamido-1-hydroxybenzene, 4,6-dichloro-2-amino-1-hydroxybenzene, 5-nitro-2-amino-1-hydroxybenzene, 4,6-dinitro-2-amino-1-hydroxybenzene, 4-chloro-5-nitro-2-amino-1-hydroxybenzene, 4-chloro-6-nitro-2-amino-1-hydroxybenzene, 6-chloro-4-nitro-2-amino-1-hydroxybenzene, 4-amino-1,3-dimethoxybenzene, 6-chloro-4-amino-1,3-dimethoxybenzene, 5-nitro-2-amino-1,4-dimethoxybenzene, 1-amino-1-hydroxybenzene-4-sulphonic acid, 6-chloro-2-amino-1-hydroxybenzene-4-sulphonic acid, 5-nitro-2-amino-anisole-4-sulphonic acid, 6-nitro-2-amino-1-hydroxybenzene-4-sulphonic acid, 4-chloro-2-amino-1-hydroxybenzene-5-sulphonic acid, 4-nitro-2-amino-1-hydroxybenzene-6-sulphonic acid, 3-amino-4-hydroxy-1-methylbenzene-5-sulphonic acid; 2-amino-1-benbene carboxylic acid, 4-chloro-2-amino-1-benzene carboxylic acid, 5-chloro-2-amino-1-benzene carboxylic acid, 6-chloro-2-amino-1-benzene carboxylic acid, 4-nitro-2-amino-1-benzene carboxylic acid, 5-nitro-2-amino-1-benzene carboxylic acid, 4-acetylamino-2-amino-1-benzene carboxylic acid, 5-acetylamino-2-amino-1-benzene carboxylic acid, 2-amino-1-benzene carboxylic acid-4-sulphonic acid, 2-amino-1-benzene carboxylic acid-4-sulphonamide, 2-amino-1-benzene carboxylic acid-5-sulphonic acid, 3-amino-2-hydroxy-1-benzene carboxylic acid, 3-amino-2-hydroxy-1-benzene carboxylic acid-5-sulphonic acid, 4-amino-2-hydroxy-1-benzene carboxylic acid, 5-amino-2-hydroxy-1-benzene carboxylic acid, 5-amino-2-hydroxy-3-methyl-1-benzene carboxylic acid. As well as those products of sulfonamidophenyl-1-amino-2-hydroxy or 2-carboxybenzenes which are substituted at the nitrogen atom of the sulfonamide group by, for example, alkyl, such as alkyl radicals having 1 to 5 carbon atoms, aryl, such as phenyl and substituted phenyl, aralkyl, such as benzyl and substituted benzyl, and dialkyl radicals which are ring-closed to form a heterocyclic ring, such as a morpholid, piperidid and piperazine ring.

As tetrazo components there are suited, for example 4,4'-diamino-3,3'-dihydroxy-diphenyl, 4,4'-diamino-3,3'-dimethoxy-diphenyl, 4,4'-diamino-3,3'-dimethoxy-diphenyl urea, 4,4'-diamino-3,3'-dicarboxy-diphenyl, 4,4'-diamino-3,3'-dicarboxystilbene.

Diazotised aminonaphthols which are also suitable as a diazo component are, for example, 1-amino-2-ethoxy-naphthalene and 1-amino-2-ethozy-naphthalene-6-sulphonic acid. Furthermore, the great number of 2-amino-5-arylazophenols, 2-amino-5-arylazoanisoles, 2-amino-4-arylazophenols and the 1-amino-2-methoxy-4-arylazo-naphthalene sulphonic acids known in the literature may be used as diazo components.

When using diazo components which have a hydroxyl or alkoxy group in the o-position to the amino or diazo group, the metallisation of the dyestuffs is already performed during the usual action of the metallising agent. Substituents which are exchanged for metal complex-forming groupings under the conditions of metallisation only, are halogen, hydrogen and sulphonic acid groups. The exchange of halogen for a metal complex-bound hydroxyl group is carried out, for example according to the process disclosed in German patent specification No. 738,900. Hydrogen and the sulphonic acid group can be transformed into the copper complex-bound hydroxyl groups by the various methods of oxidising coppering (of German patent specifications Nos. 807,289; 889,196; 893,699 and 1,006,098). Copper-containing dyestuffs may be demetallised in known manner, for example by heating with dilute acids and subsequently again transformed into the metal complex compound on the substrate or in substance.

Suitable diazo or tetrazo components for the last-mentioned processes are, for example 1-amino-2-halo-benzenes, 1-aminobenzene-2-sulphonic acids, 4,4'-diamino-diphenyl, 4,4'-diamino-3,3'-dichlorophenyl.

For the coupling with 1-diazo-2-hydroxy-4-cyanonaphthalene (4-cyanonaphthoquinone-1,2,-diazide-1) or its substitution products there are suited as coupling components, for example 1,3-dihydroxybenzene, 1-hydroxy-3-alkoxy-benzenes, 1,3-dihydroxy-2-nitrobenzene, 1,3-dihydroxy-4-chlorobenzene, 1,5-dihydroxy-naphthalene, 2-hydroxy-5-acetamino-naphthalene, 2-hydroxy-5-benzoylamino-naphthalene, 2-hydroxy-5-methansulphonyl-aminonaphthalene, 2-hydroxy-5-benzenesulphonyl aminonaphthalene, 2-hydroxy-5-acyl aminonaphthalenes, 2-hydroxynaphthalene and 2-hydroxynaphthalene-5,6,7- or 8-sulphonic acids, derivatives of these sulphonic acids such as sulphonamides and sulphones, further derivatives of 1-hydroxynaphthalene, which couple in the o-position to the hydroxy groups such as 1-hydroxynaphthalene-5-sulphonic acid, 1-hydroxynaphthalene-8-sulphonic acid, 1-hydroxy-8-chloronaphthalene-5-sulphonic acid, 1-hydroxy-4-alkoxynaphthalene, 1-hydroxy-4-methyl-naphthalene-8-sulphonic acid and derivatives of the aforesaid sulphonic acids such as sulphonamides which may also contain further substituents in the sulphonamide group.

Further excellently suited coupling compounds are inter alia pyrazolones, for example 1-phenyl-3-methylpyrazolone-5, 1-phenyl-3-carboxylic acid pyrazolone-5, 1-phenyl-5-pyrazolone-3-carboxamide, 1-(2'-sulphophenyl)-3-methylpyrazolone-5, 1-(3'-sulphonamido-phenyl)-3-methyl-pyrazolone-5, 1-(4'-sulphonamido-phenyl)-3-methyl-pyrazolone-5, 1-(2'-chloro-5'-sulpho-phenyl)-3-methyl-pyrazolone-5, 1-(4'-sulphophenyl)-3-methyl-pyrazolone-5, 1-(2',5',-dichloro-4'-sulphophenyl)-3-methyl-pyrazolone-5, 1-(3'-amino-phenyl)-3-methyl-pyrazolone-5, 1-(2'-methyl-4'-sulphophenyl)-3-methyl-pyrazolone-5, 1-(2'-methyl 3'-amino-5'-sulphophenyl)-3-methyl-pyrazolone-5, 1-(6'-sulphonaphthyl-[2'])-3-methyl-pyrazolone-5 and 1-(2'-sulphophenyl)-3-phenyl-pyrazolone-5.

The new metal-free dyestuffs are suitable for dyeing animal and vegetable materials such as wool, silk, cotton, regenerated cellulose and leather as well as synthetic polyamide and polyurethane fibres. The dyeings on vegetable fibres may be after-treated with copper salts. The dyeings of animal fibres may also be carried out by after-chroming or single-bath chroming processes.

The dyestuffs may also be converted into their metal complex compounds in substance by methods known as such. Suitable processes for this purpose are, for example the action of copper-yielding agents in ammoniacal or weakly acid medium, oxidising coppering by one of the above-mentioned processes, conversion with salts of the tri-valent cobalt in preferably ammoniacal medium as well as the conversion with salts of the hexa-valent chromium in the presence of reducing agents, preferably carbohydrates, or with chromium formate in solvents such as glycol, glycol monomethyl ether, formamide or other acid amides, or with chromic oxide in dilute alkalies or with chromium complex compounds of aromatic carboxylic acids.

The dyestuffs may also be metallised in a mixture with other metal complex-forming dyestuffs.

The following examples are given for the purpose of illustrating the invention.

Example 1

2.7 parts by weight of 1-amino-2-hydroxy-4-cyano-naphthalene are dissolved at 20–50° C. in about 12 parts by volume of glacial acetic acid containing 1.2 parts by weight of anhydrous sodium acetate. 1 part by weight of sodium nitrite is then added at room temperature to the vigorously stirred solution and stirring is continued at room temperature until nitrous acid is not longer detectable. The reaction mixture is then poured in 2000 parts by volume of ice-water and the precipitated quinone diazide is filtered off. The quinone diazide is suspended in a little water and the suspension is combined at 0–5° C. with 100 parts by volume of an aqueous solution which contains 10 parts by weight of sodium carbonate, 1.15 parts by weight of sodium hydroxide and 3.7 parts by weight of 1-(2-2'-sulphophenyl)-3-methyl-pyrazolone-5. After 10–12 hours, the resultant dyestuff is precipitated by the addition of common salt, filtered off and dried.

The red dyestuff powder dyes wool, silk and materials of similar dyeing properties in very bright bordeaux shades in the after-chroming process. The dyeings are distinguished by very good fastness properties.

If instead of 3.7 parts by weight of 1-(2'-sulphophenyl)-3-methyl-pyrazolone-5 there are used equivalent amounts of the coupling components listed in the following table, dyestuffs are obtained which dye wool, silk and materials of similar dyeing properties in the after-chroming process in the indicated shades:

| Coupling component | Shade |
|---|---|
| 1-(4'-sulphophenyl)-3-methyl-pyrazolone-5 | Bluish bordeaux. |
| 1-(2',5-dichloro-4'-sulphophenyl)-3-methyl-pyrazolone-5 | Bright reddish bordeaux. |
| 1-(2'-chloro-5-sulphophenyl)-3-methyl-pyrazolone-5 | Reddish bordeaux. |
| 1-(2'-methyl-4'-sulphophenyl)-3-methyl-pyrazolone-5 | Reddish bordeaux. |
| 1-(3'-sulphophenyl)-3-phenyl-pyrazolone-5 | Bright bordeaux. |
| 1-(6'-sulphonaphthyl-[2'])-3-methyl-pyrazolone-5 | Reddish bordeaux. |

Example 2

If instead of 1-(2'-sulphophenyl)-3-methyl-pyrazolone-5 there is used as coupling component in Example 1 the equivalent amount of 1-[3'-methyl-pyrazolone-(5")-yl-(1')-]-benzene-sulphonic acid-(3)-(2"-carboxy-anilide), a red dyestuff powder is obtained which dyes wool, silk and materials of similar dyeing properties in bordeaux shades in the single-bath chroming process. The dyeings are distinguished by very good fastness properties.

The dyestuffs obtained by the process of Example 1 and 2 can also be produced by carrying out the coupling in the presence of pyridine, other organic bases and/or formamide.

Example 3

If instead of 1-(2'-suphophenyl)-3-methyl-pyrazolone-5 there is used as coupling component in Example 1 the equivalent amount of 1-(4'-sulphonamidophenyl)-3-methyl-pyrazolone-5, a red dyestuff powder is obtained.

For conversion into the chromium complex compound, the dyestuff is dissolved in 60 parts by volume of ethylene glycol, 1 part by volume of anhydrous formic acid and 0.55 part of chromic oxide are added and the solution is kept at a temperature of 125–130° C. until no further metal-free dyestuff is detectable. After cooling, the reaction mixture is introduced into a 15% common salt solution, the precipitated dyestuff is filtered off and dried at 100° C.

The chromium complex dyestuff dyes wool, silk and materials of similar dyeing properties from a neutral and weakly acid dyebath in bright bordeaux shades of very good fastness to light, washing and carbonising.

For conversion into the cobalt complex compound, the metal-free dyestuff is dissolved in a mixture of 30 parts by volume of a 10% sodium hydroxide solution and 2 parts by volume of a 20% ammonium hydroxide solution. The dyestuff-solution is combined at room temperature with a solution of 2.04 parts by weight of cobalt sulphate in 10 parts by volume of water and 10 parts by volume of a 20% ammonium hydroxide solution. The cobalt sulphate solution is previously vigorously stirred in the atmosphere. The cobalt complex compound is formed at boiling temperature and can be completely precipitated by the addition of common salt. The dyestuff powder, obtained after filtration and drying, dyes wool, silk and materials of similar dyeing properties in bright red shades of excellent fastness properties.

Example 4

If 1-(3'-sulphonamidophenyl)-3-methyl-pyrazolone-5 is used as coupling component in Example 1 and the azo dyestuff converted into the cobalt complex compound as described there, a dyestuff is obtained which dyes wool, silk and materials of similar dyeing properties in bright red shades of very good fastness properties.

The chromium complex compound of the same dyestuff is obtained by dissolving the dyestuff paste, resulting from coupling, in 50 parts by volume of a 10% sodium hydroxide solution and combining with a solution of 1.06 parts by weight of potassium bichromate in 10 parts by volume of water. Into the bichromate-dyestuff solution heated to 80° there is added within 1 hour, the amount of glucose or tartaric acid required for reduction of the hexa-valent chromium, the mixture is then allowed to cool and the chromium complex compound completely precipitated by the addition of common salt. The metal complex dyestuff thus obtained dyes wool, silk and materials of similar dyeing properties in bright bordeaux shades. The dyeings show excellent fastness properties.

*Example 5*

If 3.02 parts by weight of 1-hydroxynaphthalene-8-sulphonamide are used as coupling component in Example 3 and the dyestuff thus obtained is transformed into the cobalt complex compound, a metal complex dyestuff is obtained which dyes wool, silk and materials of similar dyeing properties in bright grey shades; the dyeings show very good fastness properties.

The chromium complex compound of the same dyestuff dyes wool, silk and materials of similar dyeing properties in grey shades; the dyeings are distinguished by a very good fastness to light.

*Example 6*

100 g. of a woolen fabric are introduced into a dyebath at 40–50° C. which contains 10% of Glauber's salt and 5% of acetic acid (30%) as well as 2 g. of the well dissolved dyestuff listed in the table of Example 1, first component. The dyebath is slowly heated to the boil and kept at the boiling temperature for ½ hour. The dyebath is exhausted by a further addition of 2% of sulphuric acid (96%) and boiling continued for ½ hour.

The dyebath is then cooled by running in cold water and the dyeing is developed at the boil with potassium bichromate for ½ hour. A bluish bordeaux dyeing is obtained.

*Example 7*

18.8 parts by weight of 2-amino-1-hydroxybenzene-4-sulfonamide are diazotised in usual manner with 6.9 parts by weight of sodium nitrate. The diazonium salt solution is buffered with sodium bicarbonate until congo paper no longer changes to blue color. The diazonium salt solution is then combined at 0 to 5° C. with a solution of 16.9 parts by weight of 4-cyano-2-hydroxynaphthalene in a mixture from 75 parts by weight of pyridine and 25 parts by volume of 25 percent aqueous ammonia. The reaction mixture is kept at 0 to 5° C. for 8 hours and then maintained at room temperature over night. The dyestuff formed is completely precipitated by the addition of 10 percent hydrochloric acid, filtered and washed with water and dried.

36.8 parts by weight of the dyestuff are pasted with 200 parts by volume of water; 10 percent soda lye is then added until the dyestuff completely dissolves and the solution shows a smooth alkaline reaction. It is then heated to 80 to 100° C. and treated with a cobalt sulfate solution which was obtained as follows:

15.6 parts by weight of cobalt sulfate in 70 parts by volume of water are combined with a mixture of 140 parts by volume of water and 240 parts by volume of 20 percent aqueous ammonia and then treated with 3.85 parts by volume of 30 percent hydrogen peroxide. The reaction mixture is then heated to 80 to 90° C. until the metal complex formation is complete. The mixture is then cooled down to 15 to 18° C. and the metal complex dyestuff precipitated with sodium chloride. After filtering and drying it represents a red powder which after neutral to weakly acid bath dyes wool, silk and fibres of similar dyeing properties in bordeaux shades with very good fastness properties.

*Example 8*

13.7 parts by weight of anthranilic acid are diazotised and, in accordance with the procedure described in Example 7, coupled with 2-hydroxy-4-cyanonaphthalene-6-sulfonic acid. The formed dyestuff is precipitated with the addition of hydrochloric acid, then filtered and dried. It is a red powder which dyes wool, silk and materials of similar dyeing properties by the after-chrom process in red shades. The dyeings exhibit very good fastness properties.

*Example 9*

26.4 parts by weight of 1-amino-2-hydroxy-4-cyanonaphthalene-6-sulfonic acid are diazotised and then coupled with a solution of 18.2 parts by weight of 1-phenyl-3-methyl-5-pyrazolone in 50 parts by volume of pyridine; 100 parts by volume of 20 percent soda lye are added at 0 to 5° C. to the coupling mixture. When the coupling is complete the dyestuff is precipitated with hydrochloric acid, filtered and dried. It dyes wool, silk and fabrics of similar dyeing properties according to the after-chrom process in very clear bluish bordeaux shades. The dyeings distinguish themselves by very good fastness properties.

We claim:

A metal-containing azo dyestuff corresponding to the formula

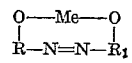

wherein R stands for the residue of a pyrazolone-5 bound to the azo bridge in 4-position and linked with the oxygen atom in 5-position and $R_1$ stands for the radial of a 4-cyanonaphthalene bearing the azo bridge in 1-position and the —O— group in 2-position, and wherein Me stands for a metal atom selected from the group consisting of copper, cobalt and chromium.

References Cited in the file of this patent

FOREIGN PATENTS 381,602     Great Britain _____ Oct. 10, 1932

OTHER REFERENCES

Hodgson et al.: Chemical Society Journal (London) (1944), pages 539–40 and 260–150.